United States Patent [19]

Flexman et al.

[11] Patent Number: 5,498,650

[45] Date of Patent: Mar. 12, 1996

[54] POLY(LACTIC ACID) COMPOSITION HAVING IMPROVED PHYSICAL PROPERTIES

[75] Inventors: Edmund A. Flexman; William E. Kelly, Jr., both of Wilmington, Del.

[73] Assignee: Ecological Chemical Products, Wilmington, Del.

[21] Appl. No.: 393,773

[22] Filed: Feb. 24, 1995

[51] Int. Cl.⁶ .................................................. C08K 5/15
[52] U.S. Cl. ........................................... 524/114; 524/109
[58] Field of Search ................................... 524/109, 114

[56] References Cited

U.S. PATENT DOCUMENTS

| | | | |
|---|---|---|---|
| 3,356,625 | 12/1967 | Giessler | 324/114 |
| 3,926,644 | 12/1975 | Kaye | 106/15 AF |
| 5,216,050 | 6/1993 | Sinclair | 524/108 |
| 5,258,488 | 11/1993 | Gruber et al. | 528/354 |
| 5,360,892 | 11/1994 | Bonsignore et al. | 528/354 |
| 5,403,897 | 4/1995 | Ebato et al. | 525/444 |

Primary Examiner—Kriellion S. Morgan

[57] ABSTRACT

A poly(lactic acid) composition having improved physical properties comprises a homogeneous solid solution of (a) a polymer having a number average molecular weight of 3,000–200,000 and selected from the group consisting of (1) poly(lactic acid), (2) copolymers of lactic acid containing at least 50 mole % lactic acid units, and (3) mixtures thereof; and (b) a plasticizer comprising an epoxidized oil selected from the group consisting of (1) epoxidized soybean oil; and (2) epoxidized linseed oil.

8 Claims, No Drawings

POLY(LACTIC ACID) COMPOSITION HAVING IMPROVED PHYSICAL PROPERTIES

FIELD OF THE INVENTION

The invention relates to poly(lactic acid) generally and, more particularly, to poly(lactic acid) compositions having improved physical properties. The novel compositions can be used in the manufacture of packaging films, filters, foamed products, injection molded products and shaped articles.

BACKGROUND OF THE INVENTION

Polymers and copolymers of lactic acid, generally known as poly(lactic acid), slowly hydrolyze and degrade to environmentally benign products. These polymers are well behaved thermoplastics with appealing aesthetic qualities. Consequently, high molecular weight polymers (that is, those having a molecular weight of at least 10,000 and typically in the range of 15,000 to 500,000) of lactic acid are potential replacements for poly(styrene) and other non-biodegradable polymers in numerous applications, such as packaging. In addition, lactic acid has been suggested as an agent to inhibit growth of microorganisms on meats, poultry, seafood and other moisture-containing perishable items.

However, a major disadvantage of poly(lactic acid) as a packaging material is that it has relatively poor mechanical strength. Thus, while these polymers were suitable for films and the like, their lack of mechanical strength prevented their use in such applications as bottles, foamed trays, shaped containers and the like.

Epoxy plasticizers; i.e., epoxidized oils and esters, are generally known and have been shown to improve the appearance and durability of vinyl products. These plasticizers are also known to act synergistically with mixed metal stabilizers. This invention is based on the discovery that poly(lactic acid) compositions containing an epoxidized oil as a plasticizer have improved physical properties.

SUMMARY OF THE INVENTION

In one aspect, the invention comprises a poly(lactic acid) composition having improved physical properties, the composition comprising a homogeneous solid solution of:

(a) a polymer having a number average molecular weight of 3,000–200,000 and selected from the group consisting of
 (1) poly(lactic acid),
 (2) copolymers of lactic acid containing at least 50 mole % lactic acid units, and
 (3) mixtures thereof;
and
(b) a plasticizer comprising an epoxidized oil selected from the group consisting of
 (1) epoxidized soybean oil; and
 (2) epoxidized linseed oil.

The poly(lactic acid) compositions of this invention may also contain conventional additives, such as fillers, pigments, stabilizers and the like, if desired, depending primarily on the intended use of the composition. If the compositions of this invention are intended for use as food packaging, e.g. foamed trays for meat and poultry products, a lactic acid-based compound such as lactide or lactic acid oligomers may be incorporated into the composition to provide antibacterial properties to the product. Because the use of such compounds increases the difficulty of processing the poly(lactic acid) compositions, however, they are not generally preferred.

DETAILED DESCRIPTION OF THE EMBODIMENTS

General

The invention is directed broadly to poly(lactic acid) compositions having improved physical properties, thus making possible their use in injection molded articles, shaped containers and the like, in addition to films. The poly(lactic acid) compositions are degradable and safe for contact with food. The compositions are comprised of a poly(lactic acid) homopolymer or copolymer and an epoxidized oil. A lactic acid-based compound which is hydrolyzable to form lactic acid may be incorporated into the composition for particular applications, as well as conventional additives such as fillers, pigments, stabilizers and the like, if desired.

Poly(lactic acid)

Suitable polymers for use in this invention are poly(lactic acid) homopolymers and copolymers of lactic acid containing at least 50 mole % lactic acid units and mixtures thereof having a number average molecular weight of 3,000–200,000.

Poly(hydroxy acid)s such as poly(lactic acid) are typically prepared by the catalyzed ring-opening polymerization of the cyclic ester (lactone) or the dimeric cyclic ester of the monomer. Because of its manner of preparation, poly(lactic acid) is frequently referred to as poly(lactide). As used herein, the terms "poly(lactic acid)" and "poly(lactide)" are interchangeable and may be abbreviated as "PLA."

Copolymers of lactic acid are typically prepared by catalyzed copolymerization of lactide with one or more cyclic esters and/or dimeric cyclic esters. Typical co-monomers are: glycolide (1,4-dioxane-2,5-dione), the dimeric cyclic ester of glycolic acid; β-propiolactone, the cyclic ester of 3-hydroxypropanic acid; a, a-dimethyl-β-propiolactone, the cyclic ester of 2,2-dimethyl-3-hydroxypropanic acid; β-butyrolactone, the cyclic ester of 3-hydroxybutyric acid; δ-valerolactone, the cyclic ester of 5-hydroxypentanoic acid; ε-caprolactone, the cyclic ester of 6-hydroxyhexanoic acid, and the lactones of its methyl substituted derivatives, such as 2-methyl-6-hydroxyhexanoic acid, 3-methyl-6-hydroxyhexanoic, 4-methyl-6-hydroxyhexanoic acid, 3,3,5-trimethyl-6-hydroxyhexanoic acid, etc., the cyclic ester of 12-hydroxydodecanoic acid; and 2-p-dioxanone, the cyclic ester of 2-(2-hydroxyethyl)-glycolic acid.

Particularly preferred are star shaped block copolymers of PLA and poly(caprolactone) as described in U.S. patent application Ser. No. 230,944, filed Apr. 21, 1994, incorporated herein in its entirety by reference.

Poly(lactic acid) and the lactic acid copolymers contemplated for use herein typically have glass transition temperatures ("Tg") of about 50° C. in contrast to the Tg of about 150° C. for polycarbonates and 70° C. for polyesters. Further, the degradation temperature of polycarbonate typically occurs at about 360° C. while degradation of lactic acid polymers typically occurs at about 180° C.

Lactide is prepared by: (1) polymerizing lactic acid to form an oligomer, i.e., a relatively low molecular weight poly(lactic acid); (2) heating the oligomer, generally in the presence of a catalyst, to depolymerize it to lactide; and (3) recovering and purifying the lactide. See, for example, Lowe, U.S. Pat. No. 2,668,162; Bhatia, U.S. Pat. Nos. 4,835,293 and 5,023,349; DeVries, U.S. Pat. No. 4,797,468; and Muller, U.S. Pat. No. 5,053,522. Lactide may exist in any of four forms: D-, also known as D,D-; L-, also known as L,L-; D,L-; and meso.

Polymerization of cyclic esters and dimeric cyclic esters catalyzed by tin compounds is disclosed in Young, U.S. Pat. No. 2,890,208; Blood, U.S. Pat. No. 3,645,941; and Versfelt, U.S. Pat. No. 3,839,297. Tin compounds, such as stannous 2-ethylhexanoate (tin octoate) and other esters of tin (II) with carboxylic acids containing up to 18 carbon atoms as well as tetraphenyl tin, are well-known lactide polymerization catalysts. Polymerization with tin oxides is described in H. R. Kricheldorf and A. Serra, Polymer Bulletin, 14, 497–502, 1985. Polymerization of lactide with stannous 2-ethylhexanote is described in J. W. Leenslag and A. J. Pennings, Makrotool. Chem. 188, 1809–1814 (1987). Typically about 0.01–1% by weight of tin catalyst is used.

Polymerization by yttrium compounds and by rare earth compounds has also been described. Polymerization of lactide with catalysts such as yttrium tris(methyl-S-lactate) and samarium tris(2-N,N-dimethylaminoethoxide) is described in McLain, U.S. Pat. No. 5,028,667. Polymerization of lactide with lanthanum bis(2,2,6,6-tetramethylheptane-3,5-dionato)-i-propoxide is described in Ford, U.S. Pat. No. 5,208,297.

Polymerization of lactide with ether complexes such as lanthanum tris(2,2,6,6-tetramethylheptanedionate) diethyleneglycoldiethyl ether complex is described in Ford, PCT Application PCT/US92/11309.

When copolymers of lactic acid are used in the invention, it is preferred that they contain at least 50 mole % lactic acid units. It is still further preferred that such copolymers contain at least 70 mole % lactic acid units.

Plasticizer

The plasticizers used in the present invention comprise epoxidized linseed oil and epoxidized soybean oil. These epoxy plasticizers are commercially available from manufacturers such as Union Carbide, Ferro Corporation and Witco Chemical. The oxirane oxygen content of epoxidized soybean oil and epoxidized linseed oil are about 7% by weight and about 10% by weight, respectively. The oxirane oxygen content is a measure of the epoxide value of the plasticizers and is related to the degree of unsaturation in the oil. The oxirane oxygen value is determined by nonaqueous potentiometric titrimetry using perchloric acid in the presence of tetraethylammonium bromide.

The epoxidized oils have low volatility (flash point approx. 290° C.), poor water solubility (<0.01% by weight @20° C.) and a molecular weight of about 1000. They are both sanctioned by the FDA for certain food contact applications. Epoxidized soybean oil is the preferred plasticizer for use in the present invention because of its lower cost and greater acceptability for food contact applications.

The epoxidized oil plasticizer may comprise from 0.5–25% by weight of the total PLA composition. At levels below 7% epoxidized oil plasticizer, the PLA compositions do not show any improvement in physical properties. At levels above about 15%, no additional increase in physical properties in the PLA composition is observed and the composition becomes increasingly difficult to process.

Other Ingredients

If the end use of the PLA composition would benefit from the anti-microbial activity of lactic acid, a lactic acid-based compound may be incorporated into the composition. In general, the lactic acid-based compound is one which will hydrolyze to form liquid lactic acid. In particular, suitable lactic acid-based compounds are lactide and low molecular weight oligomers of lactic acid having from 2–10 monomeric units. If employed, the lactic acid-based compounds may be present in amounts from 25–40 % by weight of the total PLA composition.

Conventional additives, such as fillers, pigments, stabilizers, additional plasticizers, and the like may be employed in the PLA compositions of this invention, if desired.

Industrial Applicability

The PLA compositions of this invention may be used in a variety of forms for packaging applications. For example, these compositions can be formed as self-supporting films for food wraps or they may formed be as films and laminated to a cellulosic or polymeric substrate. If desired, the films may be coated with a layer of aluminum, gold, silver, platinum, copper, nickel titanium or tantalum as disclosed in copending application U.S. Ser. No. 08/171,080, filed Dec. 21, 1993 for Metalized Poly(Lactic Acid) Films, incorporated herein in its entirety. As an alternative to the laminate structure, the compositions of this invention may be coated directly onto a cellulosic or polymeric substrate.

In addition to films and coatings, the compositions of this invention may be blow molded or injection molded to form a variety of shaped articles, such as bottles for beverages (milk, soda, juice, etc.), shampoo bottles, perfume bottles, jars, bags, containers, trays, and the like.

EXAMPLES

A series of PLA formulations were prepared on a 30 mm twin-screw compounder and then injection molded to produce test specimens for testing ASTM D256-Izod Impact, D638-Tensile Properties, and D790-Flexural Properties. The PLA formulations had the compositions set forth in Table 1. The physical properties of the PLA formulations were then evaluated. Results are reported in Table 2.

TABLE 1

| Sample Number | Composition (% by weight) | | | |
|---|---|---|---|---|
| | PLA[1] | Soy Oil[2] | Linseed Oil[3] | Boric Acid[4] |
| 1 | 99.5 | — | — | 0.5 |
| 2 | 96.5 | 3 | — | 0.5 |
| 3 | 92.5 | 7 | — | 0.5 |
| 4 | 89.5 | 10 | — | 0.5 |
| 5 | 84.5 | 15 | — | 0.5 |
| 6 | 96.5 | — | 3 | 0.5 |
| 7 | 92.5 | — | 7 | 0.5 |

Notes
1. L-poly(lactic acid)
2. Drapex ® 6.8 epoxidized soy oil, Witco Chemical, Taft, LA
3. Drapex ® 10.4 epoxidized linseed oil, Witco Chemical, Taft, LA
4. Boric acid used as a stabilizer.

TABLE 2

| Sample Number | TM (Kpsi)[1] | TS @ Y (Kpsi)[2] | % E @ Break[3] | NI (ft.lb./in.)[4] | FM (Kpsi)[5] | FS @ B (Kpsi)[6] |
|---|---|---|---|---|---|---|
| 1 | 541 | 6.5 | 3.1 | 0.3 | 509 | 10.5 |
| 2 | 532 | 6.0 | 3.9 | 0.3 | 483 | 10.0 |
| 3 | 463 | 5.5 | 6.1 | 0.6 | 441 | 9.4 |
| 4 | 474 | 5.2 | 8.6 | 0.6 | 432 | 9.2 |
| 5 | 471 | 4.4 | 14.4 | 0.6 | 416 | 8.3 |

TABLE 2-continued

| Sample Number | TM (Kpsi)[1] | TS @ Y (Kpsi)[2] | % E @ Break[3] | NI (ft.lb./in.)[4] | FM (Kpsi)[5] | FS @ B (Kpsi)[6] |
|---|---|---|---|---|---|---|
| 6 | 524 | 6.4 | 3.5 | 0.3 | 453 | 9.6 |
| 7 | 487 | 6.5 | 5.1 | 0.3 | 459 | 10.2 |

Notes
1. Tensile Modulus determined in accordance with ASTM D638
2. Tensile Strength at yield determined in accordance with ASTM D638
3. Percent Elongation at break determined in accordance with ASTM D638.
4. Notched Izod determined in accordance with ASTM D256.
5. Flexural Modulus determined in accordance with ASTM D790.
6. Flexural Strength at break determined in accordance with ASTM D790.

Discussion of Results

As can be seen from the foregoing data, the addition of the epoxidized oils resulted in an increase in percent elongation and Notched Izod as compared to the control (Sample 1), thus indicating an improved toughening of the PLA polymer matrix. On the other hand, the strength and stiffness of the PLA compositions were relatively unaffected by the addition of the epoxidized oil. These results are surprising and unexpected, as one would expect that the addition of a liquid such as oil would significantly soften the resulting mixture.

What is claimed is:

1. A poly(lactic acid) composition which is a homogeneous solid solution comprising (a) A polymer having a number average molecular weight of 3,000–200,000 selected from the group consisting of (1) poly(lactic acid), (2) copolymers of lactic acid containing at least 50 mole % lactic acid units, and (3) mixtures thereof, and (b) 7–25% wt., basis total composition weight, of an epoxidized oil plasticizer selected from the group consisting of (1) epoxidized soy bean oil, (2) epoxidized linseed oil and (3) mixtures thereof.

2. The composition of claim 1 in which the epoxidized oil is epoxidized soy bean oil.

3. The composition of claim 1 in which the epoxidized oil is epoxidized linseed oil.

4. The composition of claim 1 in which the polymer is a copolymer of poly(lactic acid) and caprolactone triol.

5. The composition of claim 1 in which the polymer is a copolymer of poly(lactic acid) and caprolactone tetrol.

6. The composition of claim 1 which contains 7–15% wt. plasticizer.

7. A shaped article comprising the composition of claim 1.

8. The shaped article of claim 7 which is formed by injection molding.

* * * * *